(12) United States Patent
Nica et al.

(10) Patent No.: US 10,565,286 B2
(45) Date of Patent: Feb. 18, 2020

(54) CONSTRUCTING JOIN HISTOGRAMS FROM HISTOGRAMS WITH Q-ERROR GUARANTEES

(71) Applicant: SAP SE, Walldorf (DE)

(72) Inventors: Anisoara Nica, Waterloo (CA); Kaleb Paul Alway, Sarnia (CA)

(73) Assignee: SAP SE, Walldorf (DE)

( * ) Notice: Subject to any disclaimer, the term of this patent is extended or adjusted under 35 U.S.C. 154(b) by 540 days.

(21) Appl. No.: 15/392,107

(22) Filed: Dec. 28, 2016

(65) Prior Publication Data

US 2018/0181542 A1 Jun. 28, 2018

(51) Int. Cl.
*G06F 16/2453* (2019.01)
*G06F 17/18* (2006.01)

(52) U.S. Cl.
CPC ........ *G06F 17/18* (2013.01); *G06F 16/24542* (2019.01)

(58) Field of Classification Search
CPC ............................ G06F 16/24542; G06F 17/18
See application file for complete search history.

(56) References Cited

U.S. PATENT DOCUMENTS

| 5,870,752 | A  | * | 2/1999  | Gibbons    | G06F 16/2358 |
|-----------|----|---|---------|------------|--------------|
| 6,263,345 | B1 | * | 7/2001  | Farrar     | G06F 16/2462 |
|           |    |   |         |            | 707/688      |
| 6,865,567 | B1 | * | 3/2005  | Oommen     | G06F 16/2462 |
| 9,189,520 | B2 |   | 11/2015 | May et al. |              |
| 9,361,339 | B2 |   | 6/2016  | DeHaan     |              |
| 2003/0126127 | A1 | * | 7/2003  | Abdo       | G06F 16/2462 |
| 2004/0010488 | A1 | * | 1/2004  | Chaudhuri  | G06F 16/2462 |
| 2010/0250517 | A1 | * | 9/2010  | Bendel     | G06F 16/284  |
|              |    |   |         |            | 707/714      |
| 2011/0029507 | A1 | * | 2/2011  | Au         | G06F 16/24556 |
|              |    |   |         |            | 707/714      |
| 2014/0379693 | A1 | * | 12/2014 | May        | G06F 16/24545 |
|              |    |   |         |            | 707/718      |

(Continued)

OTHER PUBLICATIONS

Guido Moerkotte, et al., "Exploiting Ordered Dictionaries to Efficiently Construct Histograms with Q-Error Guarantees in SAP HANA," 2014, 12 pages.

*Primary Examiner* — James Trujillo
*Assistant Examiner* — Hubert Cheung
(74) *Attorney, Agent, or Firm* — Sterne, Kessler, Goldstein & Fox P.L.L.C.

(57) ABSTRACT

Disclosed herein are system, method, and computer program product embodiments for generating join histograms. An embodiment operates by a computer implemented method that includes determining, by at least one processor, a first interval associated with a first histogram of a first data structure and a first estimate frequency associated with the first interval. The method further includes determining, by the at least one processor, a second interval associated with a second histogram of a second data structure and a second estimate frequency associated with the second interval. The method further includes determining, by the at least one processor, a join interval based on the first and second intervals by calculating an intersection of the first and second intervals. The method further includes calculating, by the at least one processor, a join estimate frequency based on the first and second estimate frequencies.

20 Claims, 8 Drawing Sheets

(56) References Cited

U.S. PATENT DOCUMENTS

| | | | |
|---|---|---|---|
| 2015/0149441 A1 | 5/2015 | Nica et al. | |
| 2015/0220617 A1* | 8/2015 | Luo | G06F 16/285 707/737 |
| 2015/0370857 A1 | 12/2015 | Nica et al. | |
| 2017/0228425 A1* | 8/2017 | Kandula | G06N 7/005 |

* cited by examiner

CONSTRUCTING JOIN HISTOGRAMS FROM HISTOGRAMS WITH Q-ERROR GUARANTEES

BACKGROUND

Query optimization depends in large part on efficient and accurate cardinality estimates of intermediate results and the plan for the order of a sequence or set of operators representative of a query. In some aspects, the order of the operators to implement the query may be determined with relative ease, particularly as compared to the process of accurately determining a cardinality estimate.

Various methods have been previously proposed for determining cardinality estimates. However, a number of the previous proposals may result in unbounded estimation errors. Also, since the building of a histogram typically involves the accessing of data via a data scan the manner in which the data is stored may impact the efficiency of the histogram construction.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for generating join histograms.

Histograms are implemented and used in any database system, usually defined on a single-column of a database table. However, one of the most desired statistical data in such systems are statistics on the correlation among columns. Some of the embodiments of this disclosure include algorithms for building a join histogram that accepts two or more single-column histograms over different attributes (some with acceptable error), and produce a histogram over the result of the join operation on these attributes. The join histogram is built from the input histograms without accessing the base data or computing the join relation. Under certain assumptions, an error guarantee (e.g., q-error acceptable as discussed in more detail below) can be placed on the produced join histogram.

Some algorithms of the embodiments of this disclosure can run in linear time with respect to the size of the input histograms, and can produce a join histogram that is at most as large as the sum of the sizes of the input histograms. These join histograms can be used to efficiently and accurately estimate the cardinality of queries such as join queries.

Figure 1:
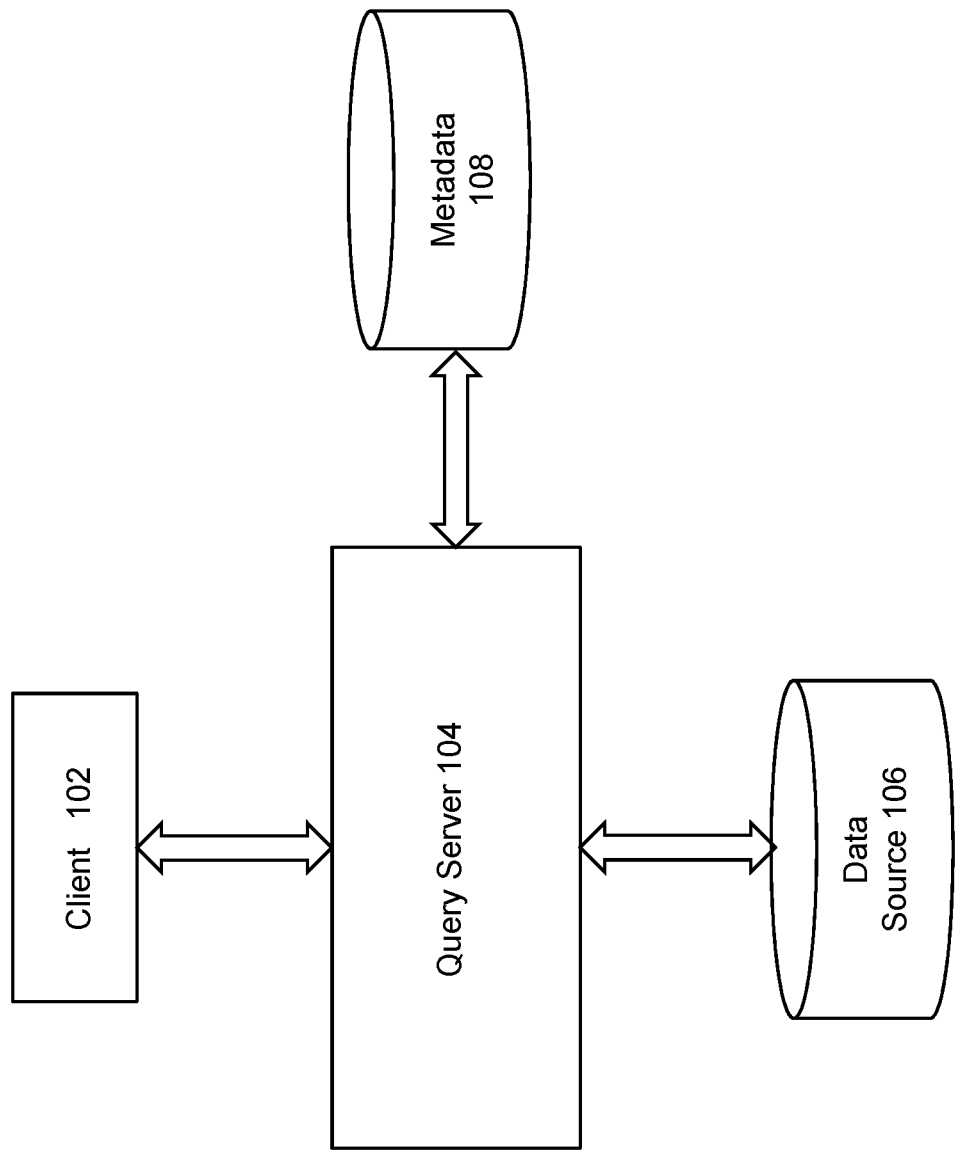
FIG. 1 is a block diagram of a system architecture including a query server, according to some embodiments.

FIG. 1 is a block diagram of a system 100, according to some embodiments. System 100 can include client device 102, query service 104, and data source 106. Data source 106 may comprise any query-responsive data source or sources that are or become known, including but not limited to a structured-query language (SQL) relational database management system. Data source 106 may comprise a relational database, a multi-dimensional database, an eXtendable Markup Language (XML) document, or any other data storage system storing structured and/or unstructured data. The data of data source 106 may be distributed among several relational databases, multi-dimensional databases, and/or other data sources. Embodiments are not limited to any number or types of data sources. For example, data source 106 may comprise one or more OnLine Analytical Processing (OLAP) databases, spreadsheets, text documents, presentations, etc.

In some embodiments, data source 106 is implemented in Random Access Memory (e.g., cache memory for storing recently-used data) and one or more fixed disks (e.g., persistent memory for storing their respective portions of the full database). Alternatively, data source 106 may implement an "in-memory" database, in which volatile (e.g., non-disk-based) memory (e.g., Random Access Memory) is used both for cache memory and for storing its entire respective portion of the full database. In some embodiments, the data of data source 106 may comprise one or more of conventional tabular data, row-based data stored in row format, column-based data stored in columnar format, and object-based data. Data source 106 may also or alternatively support multi-tenancy by providing multiple logical database systems which are programmatically isolated from one another. Moreover, the data of data source 106 may be indexed and/or selectively replicated in an index to allow fast searching and retrieval thereof.

Metadata 108 may provide information regarding the structure, relationships and meaning of the data stored within data source 106. Metadata 108 may also include data defining views on the stored data, and queries that may be executed upon the stored data. Metadata 108 may be generated by a database administrator.

Query server 104 generally provides data of data source 106 to reporting clients, such as client device 102, in response to instructions (e.g., SQL statements) received therefrom. In some embodiments, query server 104 receives an instruction from client device 102. Query server 104 generates an execution plan based on the instruction and based on metadata 108. The execution plan is forwarded to data source 106, which executes the plan and returns a dataset based on, for example, the SQL script. Query server 104 then returns the dataset to client device 102. It is noted that the embodiments are not limited these examples and query server 104 can be operable to determine the data requested by the query, obtain the data, and provide a reply to the query in other manners. One skilled in the relevant arts will appreciate that while query server 104 is illustrated as a single module in system 100, query server 104 may be implemented in a number of ways in order to accomplish the same function, including separating each of the aforementioned operations performed by query server 104 into individual modules. Accordingly, the illustration of modules in system 100 is not a limitation on the implementation of the system.

Additionally, data source 106 can comprise alternate means of indexing data (e.g., bitmap) stored in a table of a database, in accordance with an embodiment. Query server 104 can be operable to analyze a query to determine whether an available alternate means is useful to optimally access the data stored in a table, and then depending on the result of the analysis utilizes this alternate means to obtain data from the table, in accordance with an embodiment.

Client device 102 may comprise one or more devices executing program code of a software application for presenting user interfaces to allow interaction with query server 104. Presentation of a user interface may comprise any degree or type of rendering, depending on the type of user interface code generated by query server 104. For example, client device 102 may execute a Web Browser to receive a Web page (e.g., in HTML format) from query server 104, and may render and present the Web page according to known protocols. Client device 102 may also or alternatively present user interfaces by executing a standalone executable file (e.g., an .exe file) or code (e.g., a JAVA applet) within a virtual machine.

In some embodiment, client device 102, query server 104, data source 106, and metadata 108 can communicate with each other directly, over a network, or a combination of thereof. A network (not shown) can optionally be either a public or private communications network. In accordance with an embodiment, the network can be the Internet. In accordance with an additional embodiment, the network can be a private intranet, such as a corporate network. The network can be any other form of wired or wireless network.

Figure 2:
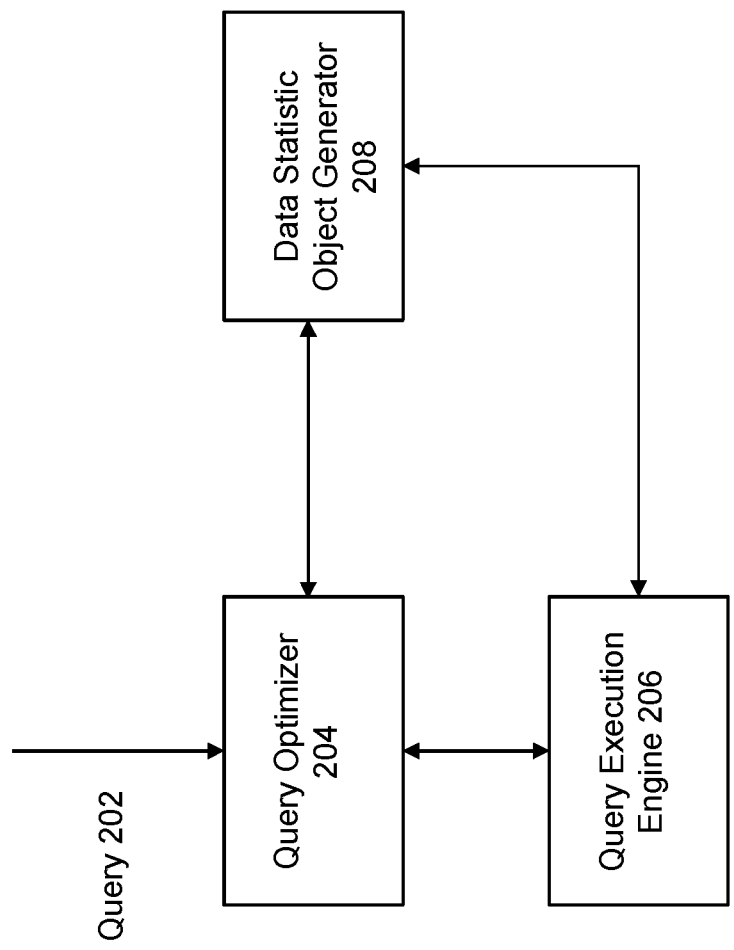
FIG. 2 is a block diagram of a database management system, according to some embodiments.

FIG. 2 is a block diagram of a database management system (DBMS) 200, according to some embodiments. DBMS 200 may include or incorporate aspects of the system of FIG. 1, including for example, data source 106, query server 104, and metadata 108. In one example, system 200 can be part of query server 104. Additionally or alternatively, system 200, data source 106, query server 104, and metadata 108 can be part of a database computing environment. A query 202 may be sent to, obtained by, or otherwise received by a cost based query optimizer 204. Optimizer 204 may be implemented by a query server 104 or other server providing the services and functionality of optimizer 204. Optimizer 204 may operate to produce a query execution plan for executing the query request 202 in a "cost effective" manner. In some aspects, query optimizer 204 and (potentially) query execution engine 206 interact with a data statistic object generator 208. In some aspects, query optimizer 204 may mainly retrieve data from data statistic object generator 208, while query execution engine 206 may have a bi-directional data exchange relationship with data statistic object generator 208.

Data statistic object generator 208 may be used by the optimizer 204 to determine or calculate the computational cost of a particular query plan (e.g., cardinality estimates.) Data statistic object generator 208 can provide an estimate of the size (e.g., number of rows) of a query plan before the query plan is executed. Based on the estimate, query optimizer 204 selects an efficient query plan that executes query from multiple query plans. Data statistic object generator 208 may interact with query execution engine 206 because the query execution engine (or data source) provides the raw data to generate statistics. In some cases, the cardinality estimates may also be used for approximate query processing. The query plan generated by query optimizer 204 may be forwarded to and executed by a query execution engine 206 of the DBMS 200 in a runtime environment (not shown). In some instances (e.g., special cases where a cardinality estimation may be too costly), query optimizer 204 may not interact with data statistic object generator 208. In some embodiments, a query server such as, for example, query server 104 may comprise data statistic object generator 208 or the functionality thereof, while in some other or alternative embodiments data statistic object generator 208 may be a component, system, subsystem, or service that is distinct from the query server.

Providing accurate data statistics is important, since the query optimizer 204 relies on them to generate query plans. Inaccurate statistics can cause the DBMS to inefficiently execute queries. Generating query plans by analyzing the database elements can be computationally cumbersome if the database is large. Data statistic object generator 208 can work to estimate properties of the database, thus obviating the need to analyze database elements each time a query plan is being created.

In databases that store large amounts of information, it can be computationally expensive and time consuming to perform the scan described above. Thus, data statistic objects can be employed to provide the query optimizer 204 with estimates rather than requiring a full scan of the database. However, in order to be useful to the query optimizer, the data statistics generated should be accurate while at the same time computationally efficient.

In some embodiments, data statistics can include one or multi-dimensional histograms, join histograms, statistics on a common table expression (CTE), etc. A person skilled in the art will appreciate that a histogram is a data structure that provides data distribution statistics for one or more columns in a database table, and that a CTE is a temporary result table defined within execution of a single query and exists as long as the query is being processed.

Cardinality estimation is an important part of the query optimization process. Therefore, histograms are often constructed to improve the quality of these estimates. Histograms are examples of a type of data object. A histogram is a summary of a dataset over multiple dimensions. Histograms are used to answer statistical questions about the data they approximate. As discussed above, one example of a statistical question is the cardinality of queries, which is the number of data elements returned by a query expression. These cardinalities can be used by query optimizers to cost and compare alternative query plans. A dataset can be defined by a collection of distinct points, wherein each point is uniquely identified by its location in multi-dimensional space. Histograms can provide summaries of the data in a given space of the plot. Histograms are generally represented as a collection of buckets, wherein each bucket stores some information about a hyper-space from the dataset. In some embodiments, these buckets are ordered.

Joins are an important operation in relational database queries. Some of the embodiments of this disclosure include algorithms for building a join histogram that accepts two or more input histograms over different attributes, each with bounded error (e.g., q-error acceptable as discussed in more detail below) and produce a histogram over the result of the join operation on these attributes. The join histogram is built from the input histograms without accessing the base data or computing the join relation.

According to some embodiments, query optimizer 204 receives a query 202. Query 202 can include a join query associated with one column of a first table and one column of a second table. In one example, query optimizer 204 is configured to operate with data statistic object generator 208 to receive and/or determine a first histogram associated with the column of the first table and a second histogram associated with the column of the second table. The first histogram is an estimate of each value in the column of the first table. The second histogram is an estimate of each value in the column of the second table. Data statistic object generator 208 alone or in combination with query optimizer 204 is configured to determine a histogram for the join query based on the first histogram and the second histogram without accessing the columns of the first and second tables or computing the join relation.

Figure 3:
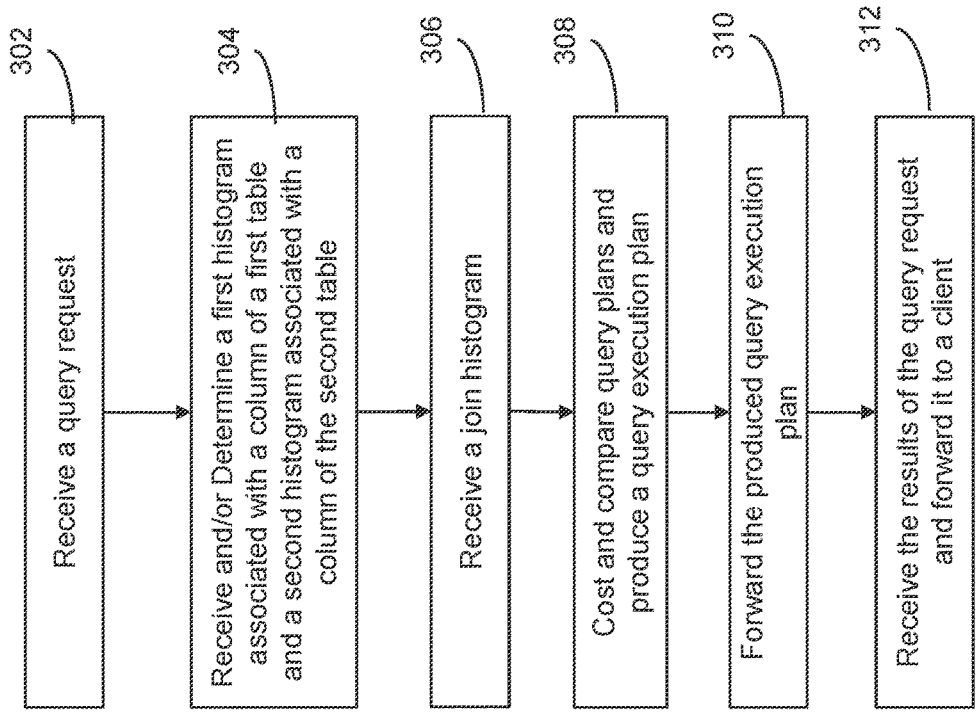
FIG. 3 is a flowchart illustrating a process for responding to a query, according to some embodiments.

FIG. 3 is a flowchart for a method 300, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIGS. 1 and 2. However, method 300 is not limited to that example embodiment.

In 302, query optimizer 204 receives a query request, such as query 202, which can include a join query associated with one column of a first table and one column of a second table. In 304, query optimizer 204 alone or in combination with data statistic object generator 208 receives and/or determines a first histogram associated with the column of the first table and a second histogram associated with the column of the second table. In some embodiments query optimizer 204 alone or in combination with data statistic object generator 208 can receive the first histogram associated with the column of the first table and the second histogram associated with the column of the second table from, for example, metadata 108 and/or data source 106.

In 306, query optimizer 204 receives a join histogram from, for example, data statistic object generator 208. Generation of join histogram is discussed in more detail below with respect to, for example, FIGS. 4-7.

In 308, query optimizer 204 uses the join histogram to cost and compare query plans and to produce a query execution plan for executing the query request 202 in a "cost effective" manner. In 310, query optimizer 204 forwards the produced query plan to, for example, query execution engine 206. In 312, query optimizer 204 can receive the results of the query 202 (from, for example query execution engine 206) and forward the results back to a client (e.g., client 102) who request the query 202. Additionally or alternatively, query optimizer 204 alone or in combination with query execution engine 206 operates on the produced query plan to perform the query and then query optimizer 204 forwards the results of the query request to the client.

Figure 4:
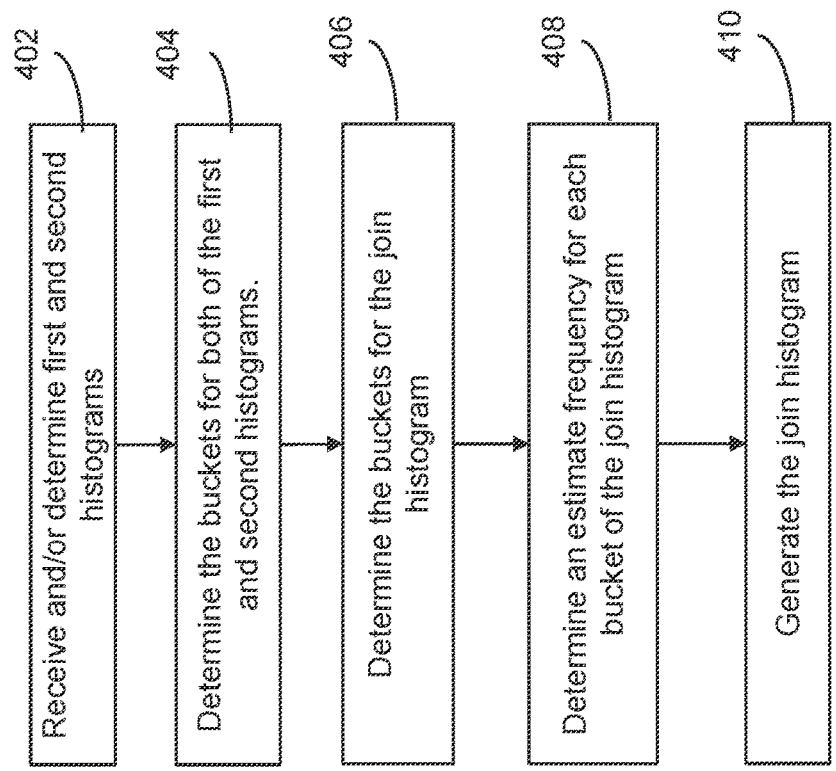
FIG. 4 is a flowchart illustrating a process for constructing a join histogram, according to some embodiments.

FIG. 4 is a flowchart for a method 400, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1 and 2. However, method 400 is not limited to that example embodiment.

In 402, data statistic object generator 208 (alone or in combination with query optimizer 204) receives and/or determines a first histogram associated with a data structure, e.g., the column of a first table and a second histogram associated with a data structure, e.g., the column of a second table. In some embodiments data statistic object generator 208 (alone or in combination with query optimizer 204) can receive the first histogram associated with the column of a first table and a second histogram associated with the column of a second table from, for example, metadata 108 and/or data source 106. The first histogram is an estimate of each value in the column of the first table. A histogram is one method of storing "summarized" frequency data about the values stored in an attribute of a relation. After it is created, a histogram can be queried to efficiently obtain cardinality estimates for any given range query on the corresponding attribute. Histograms achieve this by dividing the attribute domain into intervals (e.g., "buckets"), and storing summary data about each bucket. These estimates can be used by the query optimizer 204 to make more efficient query execution plans.

In 404, data statistic object generator 208 (alone or in combination with query optimizer 204) determines the intervals (e.g., buckets) for both of the first and second histograms. Each histogram sorts values into buckets. In determining the buckets, data statistic object generator 208 (alone or in combination with query optimizer 204) is configured to determine the range of the bucket, the estimate frequency in each bucket, and the number of distinct occurring values in each bucket for each of the first and second histograms. In one example, the estimate frequency for a bucket can indicate the number of values that are inside the range associated with that bucket that are stored in the attribute of the relation. In one example, the distinct occurring values for the bucket indicates the actual values inside that range that are stored in the attribute of the relation. In some embodiments, the distinct occurring values can be provided explicitly in each histogram. Additionally or alternatively, the distinct occurring values can be provided implicitly. For example, if the domain is dense, the bucket boundaries imply the distinct occurring values.

In 406, in order to construct the join histogram, data statistic object generator 208 (alone or in combination with query optimizer 204) determines the buckets for the join histogram based on the determined buckets of the first and second histograms. In one example, data statistic object generator 208 (alone or in combination with query optimizer 204) is configured to determine the buckets for the join histogram based on any overlapping buckets of the first and second histograms. In other words, data statistic object generator 208 (alone or in combination with query optimizer 204) evaluates the buckets of the first and second histograms to determine whether any of the buckets overlap. In some embodiments, any non-overlapping segments of the buckets of the first and second histograms can be eliminated from the search. In other words, in some embodiments, any value not occurring in both buckets of the first and second histograms can be ignored in constructing the join histogram. If one or more of the buckets of the first and second histograms overlap, the bucket of the join histogram associated with the overlapping buckets would be an intersection of the overlapping buckets of the first and second histograms.

In 408, in order to construct the join histogram, data statistic object generator 208 (alone or in combination with query optimizer 204) determines estimate frequency for each bucket of the join histogram based on the frequencies of corresponding bucket of the first and/or second histogram.

In 410, data statistic object generator 208 (alone or in combination with query optimizer 204) generates the join histogram based on the determined buckets and estimate frequencies. After generating this join histogram, query optimizer 204 can use the join histogram to determine an efficient query plan to execute. As noted above, the join histogram is built from the first and second histograms without accessing the base data or computing the join relation.

In one example, the join query can be the form of:

$$\text{Join}(J) = \Pi_{R.A}(\sigma_{(R.A=T.B) \wedge p_1(R.A) \wedge p_2(T.B)}(R \times T)$$

where
column R.A has an error-bounded histogram $H_1$,
column T.B has an error-bounded histogram $H_2$,
$p_1(R.A)$ and $p_2(T.B)$ are predicates on columns R.A and T.B, e.g., predicates for which the selectivity estimation can be computed using the histograms $H_1$ and $H_2$, respectively. For example, predicate on the column R.A can be $(R.A \varphi c)$ with $\Phi \in \{<, \leq, =, \geq, >\}$ and c a constant.

In one example, each of the histograms $H_1$ and $H_2$ provides an error-bounded (e.g., a $\theta$, q-acceptable as discussed below) estimate $\hat{f}_{v_i}$ for each value $v_j$ in the column domain, which approximates the frequency $f_{v_i}$, i.e. the number of times $v_i$ occurs in the column.

Some of the embodiments of this disclosure are directed to methods and systems to construct a histogram H for the column J of the join relation Join(J), using the input histograms $H_1$ and $H_2$, without computing the join query or accessing the base data of the relations R and T. Also, as discussed in more detail below, some of the embodiments of this disclosure illustrate the conditions under which the join histogram is also an error-bounded (e.g., $\theta$, q-acceptable.)

Assume that the first and second histograms $H_1$ and $H_2$ have an overlapping bucket with the common (e.g., intersection of) distinct occurring values $V = \{v_1, \ldots, v_k\}$ with $v_1 < \ldots < v_k$, such that each $v_i$ is in the range of the active domain of both R.A and T.B, and satisfies the filter predicates $p_1(R.A)$ and $p_2(T.B)$. Data statistic object generator 208 (alone or in combination with query optimizer 204) can estimate frequency of any individual element $v_i$ in R.A ($\hat{f}_1(v_i)$) using $H_1$. Similarly, data statistic object generator 208 (alone or in combination with query optimizer 204) can estimate a frequency for any individual element $v_i$ in T.B ($\hat{f}_2(v_i)$) using $H_2$. The $f_1(v_i)$ and $f_2(v_i)$ denote the corresponding precise frequencies.

According to some embodiments, in determining the join histogram, data statistic object generator 208 (alone or in combination with query optimizer 204) is configured to determine the overlapping bucket of histograms $H_1$ and $H_2$ and also is configured to determine the intersection of the distinct occurring values $V = \{v_1, \ldots, v_k\}$. In some examples, data statistic object generator 208 (alone or in combination with query optimizer 204) can determine the theoretical estimate for the frequency of $v_i$ in the join result as $\hat{f}(v_i) = \hat{f}_1(v_i)\hat{f}_2(v_i)$.

According to some embodiments, when the first and second histograms are error-bounded, the join histogram will also be error-bounded. In other words, when the frequencies in the first and second histograms are estimated within a threshold error, the determined estimate frequencies in the join histogram are within a second threshold error. In other words, some of the embodiments of this disclosure illustrate the conditions under which the join histogram is also $\theta$, q-acceptable (e.g., error-bounded) when a first table with $\theta_1, q_1$-acceptable histogram $H_1$ is joined by a second table with $\theta_2, q_2$-acceptable histogram $H_2$.

An estimate frequency $\hat{f}$ of a value frequency f is said to be $\theta$, q-acceptable (error-bounded) if either $f \leq \theta \hat{f} \leq \theta$ or $\|\hat{f}/f\|_Q \leq q$, where $\|x\|_Q = \max(x, 1/x)$. Note that when parameter $\theta$ is zero, the notion of $\theta$, q-acceptable is the same as a plain q-error bound. According to some embodiments, data statistic object generator 208 (alone or in combination with query optimizer 204) can be configured to determine whether a histogram is error-bounded using these equations and the parameters $\theta$ and q, which can be known parameters.

Some embodiments of this disclosure concern the statistical question of cardinality estimation of a join query. As discussed above, in one example, the join query can be the form of $\text{Join}(J) = \Pi_{R.A}(\sigma_{(R.A=T.B) \wedge p_1(R.A) \wedge p_2(T.B)}(R \times T)$ where:
column R.A has a $\theta_1, q_1$-acceptable histogram $H_1$,
column T.B has a $\theta_2, q_2$-acceptable histogram $H_2$, As discussed above, a theoretical estimate for the frequency of $v_i$ in the join result is $\hat{f}(v_i) = \hat{f}_1(v_i)\hat{f}_2(v_i)$. Further, if $\hat{f}_1, \hat{f}_2$ are estimates for $f_1, f_2$ and are $\theta_1, q_1$-acceptable and $\theta_2, q_2$-acceptable, then $\hat{f}_1 \hat{f}_2$ is a $\theta_1 \theta_2, q'$-acceptable estimate for $f_1 f_2$ where $q' = \max(\theta_1 q_2, \theta_2 q_1, q_1 q_2)$.

The following notation are introduced for frequencies and estimates:

$$f^i = f(v_i);$$

$$f^+(v_m, v_n) \stackrel{def}{=} f^+(m, n) = \sum_{m \leq i \leq n} f^i;$$

$$\hat{f}^+(v_m, v_n) \stackrel{def}{=} \hat{f}^+(m, n) = \sum_{m \leq i \leq n} \hat{f}^i.$$

It is noted that for any $1 \leq a_1 \leq a_2 \leq u$, $\hat{f}^+(a_1, a_2)$ is $(a_2 - a_1)\theta_1 \theta_2$, q'-acceptable as an estimate for $f^+(a_1, a_2)$. Therefore, $\hat{f}^+$ is an $(u-1)\theta_1 \theta_2, q'$-acceptable estimation function over the domain of the join result.

As discussed above, the join histogram can be built without accessing the based data. In one example, instead of using the true frequency value $f^+$ when checking error bounds, $\hat{f}^+$ is treated as the true frequency as these can be obtained only from the input histograms. The algorithms of this disclosure can yield a sequence of $\theta$, q-acceptable buckets, each with a different $\theta$, q, having an "estimate of an estimate," as the frequencies used to construct these buckets are estimated frequencies computed from the input histograms. The resulting join histogram's error is bounded. If $\hat{f}$ is a $\theta$, q-acceptable estimate for f and $\tilde{f}$ is a $\theta'$, q'-acceptable estimate for $\hat{f}$, then f is a $\theta\theta'$, q''-acceptable estimate for f, with $q'' = \max(qq', q'\theta, q\theta')$. Accordingly, it is possible to construct a join histogram that is $\theta$, q-acceptable for finite values of $\theta$ and q.

According to some embodiments, columns R.A and T.B can be dictionary-encoded by ordered dictionaries. That is, the distinct values in a column are mapped to the integers 0 to n in sorted order. The histograms $H_1$ and $H_2$ for these attributes can be built on the dictionary values. In other words, R.A and T.B are represented by ordered dictionaries mapping the natural numbers to actual distinct domain values. For any range of actual domain values [l,u], there are corresponding ranges $[i_1, j_1]$ for R.A and $[i_2, j_2]$ for T.B, which are the minimum ranges containing dictionary entries mapping to actual domain value in the range [l,u]. In some embodiments, supposing that $j_1 - i_1 > j_2 - i_2$, it is assumed that:

Assumption 1—For every $n \in [i_2, j_2]$, $\exists m \in [i_1, j_1]$ such that $D_2(n) = D_1(m)$, where $D_1$ and $D_2$ are the dictionaries for R.A and T.B, respectively. In other words, every distinct value of T.B in [l,u] also occurs in R.A. It is noted that the embodiments of this disclosure are not limited to this assumption and can be extended to work on histograms built directly on the domain values.

Assumption 2—If [i,j] is covered by a single bucket in a histogram H, then for any $$m \in [i, j], \hat{f}(m) = \frac{\hat{f}^+(i, j)}{j - i} \cdot (j - i)$$

is the number of distinct values in the interval (i,j) for H built on the dictionary. That is, the estimation function for every bucket uniformly distributes a single cardinality value amongst all distinct values in the bucket.

An error-bounded frequency for the join result on the range [l,u] can be computed with $$\sum_{n=i_2; D_2(n)=D_1(m)}^{j_2} \hat{f}_2(n)\hat{f}_1(m).$$

When [l,u] is contained in a single bucket, this simplifies to:

$$\hat{f}(l, u) = \sum_{n=i_2}^{j_2} \frac{\hat{f}_1^+(i_1, j_1)}{j_1 - i_1} \frac{\hat{f}_2^+(i_2, j_2)}{j_2 - i_2} = \frac{\hat{f}_1^+(i_1, j_1)\hat{f}_2^+(i_2, j_2)}{j_1 - i_1}. \quad \text{Eq. (1)}$$

According to some embodiments, data statistic object generator 208 (alone or in combination with query optimizer 204) is configured to determine a selectivity factor for the join histogram constructed from the first and second histograms. In these embodiments, data statistic object generator 208 (alone or in combination with query optimizer 204) is configured to receive and/or determine the first and second histograms and their associated dictionaries. Data statistic object generator 208 (alone or in combination with query optimizer 204) determines one or more buckets for each of the first and second histograms. Starting with the lower bound of the first bucket of the first histogram and the lower bound of the first bucket of the second histogram, data statistic object generator 208 (alone or in combination with query optimizer 204) determines the intersections of the buckets of the first histogram with the buckets of the second histogram. Accordingly, data statistic object generator 208 (alone or in combination with query optimizer 204) is configured to generate the buckets for the join histogram by determining the lower and upper bounds of each bucket of the join histogram.

Additionally, in some embodiments, data statistic object generator 208 (alone or in combination with query optimizer 204) is configured to determine the join cardinality (e.g., join estimate frequency) associated to each generated bucket of the join histogram. The cardinality of each generated bucket of the join histogram is determined based on the estimated cardinality (e.g., estimate frequency) of the buckets (and/or portion of buckets) of the first and second histogram that were used to generate the generated bucket of the join histogram. In one example, this process can be repeated until all the buckets of the first and/or second histograms have been considered. It is noted that other criteria can be used for repeating the process. Data statistic object generator 208 (alone or in combination with query optimizer 204) is configured to add the cardinality of all of the generated buckets of the join histogram. The total cardinality of the join histogram divided by a multiplication of total sizes of the first and second histogram is the selectivity factor. In some embodiments, the values stored in the dictionaries at every bucket boundary can be retrieved in one scan before the process's iteration begins.

Code Listing 1 below illustrates one example of an algorithm implemented by data statistic object generator 208 (alone or in combination with query optimizer 204) discussed above with respect to calculating the selectivity factor. However, in other embodiments, data statistic object generator 208 (alone or in combination with query optimizer 204) can implement other code/pseudo code/algorithms. Here, lowerBound(D,a) can return the smallest index i such that $D[i] \leq a$. Generally, this is a binary search on the dictionary, which can be an expensive operation in the iteration of this algorithm. In some embodiments, an adjusted lower bound function can be used that also accepts an index range to narrow the search, since at each iteration it is known which bucket the value being searched for lies in.

Code Listing 1: Non-limiting example pseudo code for determining a selectivity factor.

```
Input: histograms H₁, H₂, dictionaries D₁, D₂, range
boundaries {[, (}a₁, a₂{), ]: (either strict or non-strict boundaries).
Output: selectivity s, 0 < s ≤ 1.
(aₗ, a₂) = normalizeRange(a₁, a₂)
i₁ = lowerBound(D₁, aₗ)
i₂ = lowerBound(D₂; a₁)
b₁ = H₁ · findBucket(i₁)
b₂ = H₂ · findBucket(i₂)
card = 0
repeat
    u₁ = D₁[b₁ · upper]
    u₂ = D₂[b₂ · upper]
    u = min(u₁, u₂)
    if u₁ == u₂ then
        j₁ = b₁ · upper
        j₂ = b₂ · upper
    else if u == u₁ then
        j₁ = b₁ · upper
        j₂ = lowerBound(D₂, u)
    else
        j₁ = lowerBound(D₁, u)
```

Code Listing 1: Non-limiting example pseudo code for determining a selectivity factor.

```
    j₂ = b₂ · upper
  end if
  card = card + min(b₁ · estimated_distinct([i₁, j₁]), b₂ · estimated_distinct([i₂, j₂]))* b₁.estimated_cardinality([i₁, j₁])*b₂.estimated_cardinality([i₂, j₂])
    ─────────────────────────────────────────────────────────────────
       b₁.estimated_distinct([i₁, j₁])*b₂.estimated_distinct([i₂, j₂])

if u == u₁ then
    b₁ = H₁ · after(b₁)
  end if
  if u == u₂ then
    b₂ = H₂ · after(b₂)
  end if
  i₁ = j₁ +1
  i₂ = j₂ +1
  until u ≥ a₂
  return card / (H₁ · estimated_cardinality(a₁,a₂)* H₂ · estimated_cardinality(a₁,a₂))
```

Figure 5:
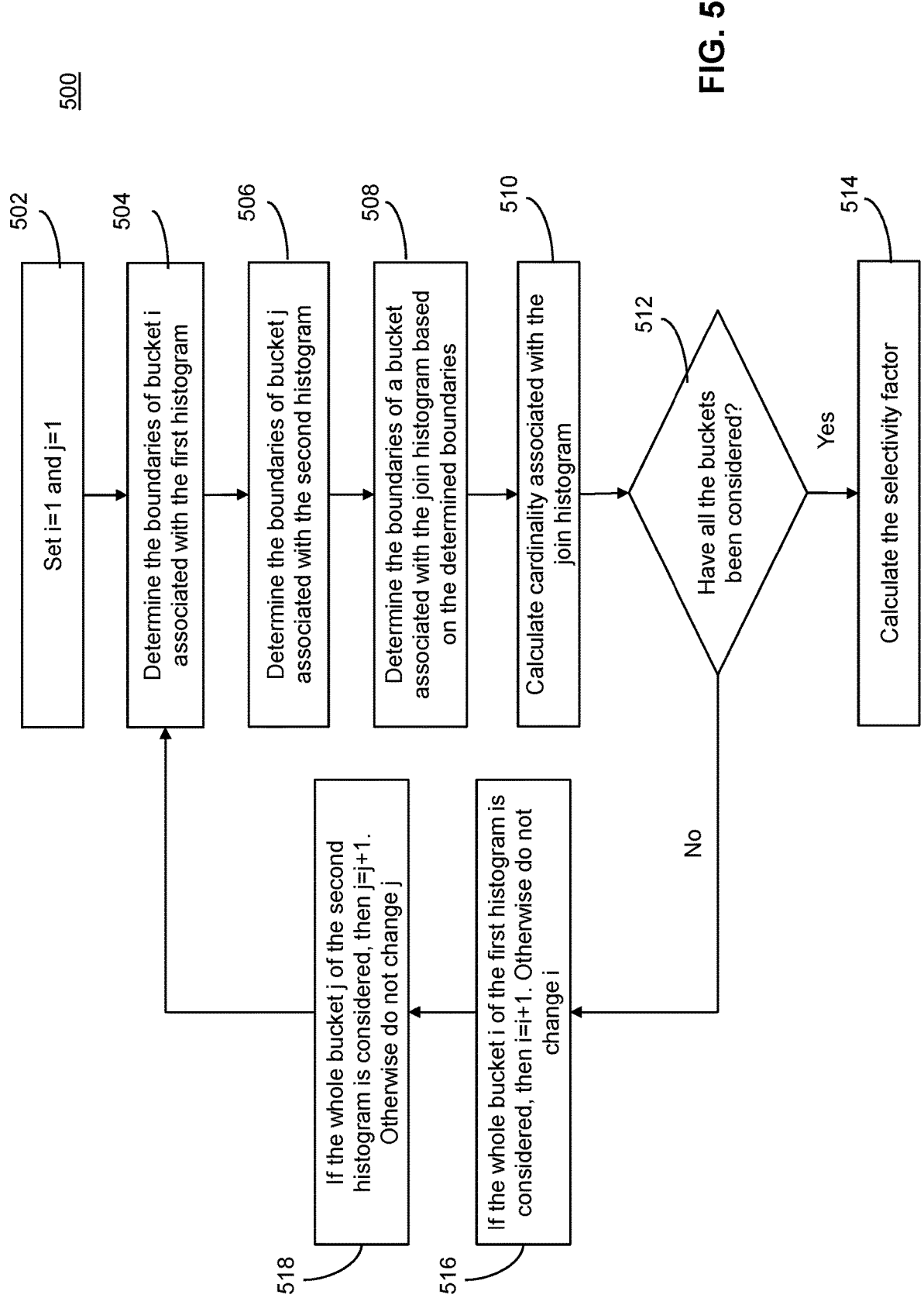
FIG. 5 is a flowchart illustrating a process for calculating a selectivity factor, according to some embodiments.

FIG. 5 is a flowchart for a method 500, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Figure 6:
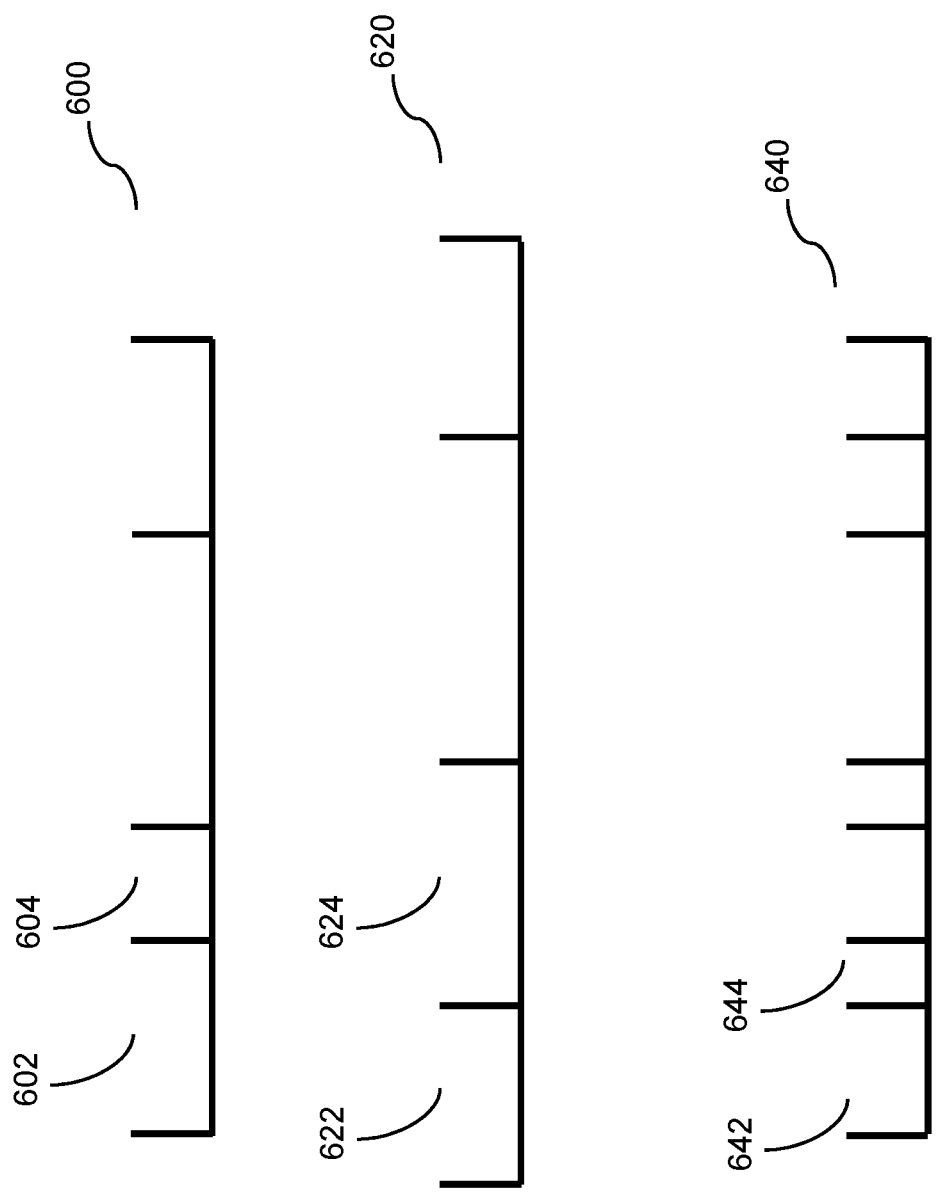
FIG. 6 is an illustration of exemplary histogram buckets, according to some embodiments.

Method 500 shall be described with reference to FIGS. 1, 2, and 6. However, method 500 is not limited to that example embodiment. Method 500 illustrate some exemplary embodiments for determining a selectivity factor. In one example, method 500 can be another implementation of Code Listing 1.

In 502, data statistic object generator 208 (alone or in combination with query optimizer 204) can set the values of variable i and j to 1. These variables can indicate the bucket in first and second histogram, respectively, that is being considered. For example, FIG. 6 illustrates an exemplary buckets of first histogram 600, exemplary buckets of second histogram 620, and exemplary buckets of join histogram 640 according to some embodiments.

In 504, data statistic object generator 208 (alone or in combination with query optimizer 204) determines boundaries (lower and upper) of bucket i associated with the first histogram. For example, boundaries of bucket 602 of first histogram 600. In 506, data statistic object generator 208 (alone or in combination with query optimizer 204) determines boundaries (lower and upper) of bucket j associated with the second histogram. For example, boundaries of bucket 622 of second histogram 620.

In 508, data statistic object generator 208 (alone or in combination with query optimizer 204) determines the boundaries of a join interval (bucket associated with the join histogram) based on the determined boundaries. In one example, the lower boundary of the bucket associated with the join histogram (e.g., bucket 642 of join histogram 640) is the maximum of the lower boundaries of the corresponding buckets of the first and second histograms (e.g., lower boundaries of buckets 602 and 622.) The upper boundary of the bucket associated with the join histogram (e.g., bucket 642 of join histogram 640) can be the minimum of the upper boundaries of the corresponding buckets of the first and second histograms (e.g., upper boundaries of buckets 602 and 622.)

In 510, data statistic object generator 208 (alone or in combination with query optimizer 204) calculates cardinality (e.g., estimate frequency) associated with the join histogram. In one example, data statistic object generator 208 (alone or in combination with query optimizer 204) calculates the join cardinality (e.g., join estimate frequency) associated with the join histogram's bucket that was determined in 508 and then adds this join cardinality to the previous value of the cardinality associated with the join histogram. In other words, data statistic object generator 208 (alone or in combination with query optimizer 204) updates the value of the cardinality associated with the join histogram each time a new bucket for the join histogram is determined. In one example, the join cardinality (e.g., join estimate frequency) associated with the currently calculated bucket of the join histogram (e.g., bucket 642) is calculated based on the estimated frequencies associated with the common parts of buckets i and j of the first and second histograms (e.g., estimated frequencies associated with the common parts of buckets 602 and 622.) In one example, the join cardinality associated with the currently calculated bucket of the join histogram (e.g., bucket 642) is calculated by multiplying the estimated frequencies associated with common parts of buckets i and j of the first and second histograms (e.g., estimated frequencies of common parts of buckets 602 and 622) and dividing the result multiplication by the size of the common part. In some embodiments, the estimated frequency associated with a part of bucket i of the first histogram (and/or the estimated frequency associated with part of bucket j of the second histogram) can be determined as a portion of the estimated frequency associated with bucket i of the first histogram (and/or the estimated frequency of bucket j associated with the second histogram). This portion can depend on the relation between the part of bucket i of the first histogram (and/or the part of bucket j of the second histogram) and the total interval of bucket i of the first histogram (and/or total interval of bucket j of the second histogram.)

Additionally or alternatively, the join cardinality (e.g., join estimate frequency) associated with the currently calculated bucket of the join histogram (e.g., bucket 642) can be calculated based on the estimated frequencies associated with buckets i and j of the first and second histograms (e.g., estimated frequencies associated with the common parts of buckets 602 and 622) as discussed above with respect to Eq. (1).

In 512, data statistic object generator 208 (alone or in combination with query optimizer 204) determines whether all the buckets of the first and second histograms have been considered. If all the buckets have been considered, in 514, data statistic object generator 208 (alone or in combination with query optimizer 204) calculates the selectivity factor by dividing total cardinality of the join histogram by a multiplication of total sizes of the first and second histogram is the selectivity factor. Data statistic object generator 208 (alone or in combination with query optimizer 204) can use the selectivity factor for query optimization.

If all the buckets have not been considered, in 516, data statistic object generator 208 (alone or in combination with query optimizer 204) determines if the whole bucket i of the first histogram is considered. If so, then the value of i is increased by one (the next bucket of the first histogram will be considered). If the whole bucket i of the first histogram has not been considered, the value of i is not increased and data statistic object generator 208 (alone or in combination with query optimizer 204) would still consider the $i^{th}$ bucket of the first histogram. In the example of FIG. 6, the whole bucket 602 has not been considered in generating join bucket 642 (e.g., upper boundary of bucket 602 has not been used yet and bucket 602 has common interval with bucket 624 of the second histogram). Therefore, in this example, data statistic object generator 208 (alone or in combination with query optimizer 204) would not increase the value of i and would still consider bucket 602 of the first histogram to generate join bucket 644.

Similarly, in 518, data statistic object generator 208 (alone or in combination with query optimizer 204) determines if the whole bucket j of the second histogram is considered. If so, then the value of j is increased by one (the next bucket of the second histogram will be considered). If the whole bucket j of the first histogram has not been considered, the value of j is not increased and data statistic object generator 208 (alone or in combination with query optimizer 204) would still consider the $j^{th}$ bucket of the first histogram. In the example of FIG. 6, the whole bucket 622 has been considered in generating join bucket 642 (e.g., upper boundary of bucket 622 has been used and bucket 622 has not common interval with bucket 604 of the first histogram.) Therefore, in this example, data statistic object generator 208 (alone or in combination with query optimizer 204) would increase the value of j and will now consider bucket 624 of the second histogram to generate join bucket 644. Next, the method returns to 504.

It is noted that the histograms 600, 620, and 640 are illustrated as non-limiting example histograms. Other histogram with other boundaries can also be considered.

The exemplary methods discussed above with respect to FIGS. 5 and 6 and Code Listing 1, can be extended to construct the join histogram representing the result of the join operation. The buckets of the join histogram are determined in the similar manner discussed with respect to exemplary methods discussed above with respect to FIGS. 5 and 6 and Code Listing 1. However, instead of calculating cardinality associated with the join histogram and also calculating the selectivity factor, the join estimate frequency associated with each bucket of the join histogram is calculated as discussed above, for example, with respect to Eq. (1). When the latest join histogram's bucket is determined and its associated join estimate frequency is calculated, the latest join histogram's bucket and its associated estimate frequency is added to the join histogram and the method is repeated to determine the next join histogram's bucket and its associated estimate frequency.

In some embodiments, the method for generating the join histogram can be similar to method 500 of FIG. 5. However, instead of 510 of FIG. 5 calculating cardinality associated with the join histogram, the method for generating the join histogram would include calculating the estimate frequency associated with each bucket of the join histogram as discussed above, for example, with respect to Eq. (1). The method for generating the join histogram would further include adding the new join histogram bucket and its associated estimate frequency to the join histogram. Further, the method for generating the join histogram would not include 514—calculating the selectivity factor.

Code Listing 2 below illustrates one example of an algorithm implemented by data statistic object generator 208 (alone or in combination with query optimizer 204) discussed above for generating a join histogram. However, in other embodiments, data statistic object generator 208 (alone or in combination with query optimizer 204) can implement other code/pseudo code/algorithms.

Code Listing 2: Non-limiting example pseudo code for constructing a join histogram.

```
Input: histograms H₁, H₂, dictionaries D₁, D₂, range
boundaries {[, (}a₁, a₂{), ]}.
Output: a histogram H for the result of the join
  (a₁, a₂) = normalizeRange(a₁, a₂)
  i₁ = lowerBound(D₁, a₁)
  i₂ = lowerBound(D₂, a₁)
  b₁ = H₁ · findBucket(i₁)
  b₂ = H₂ · findBucket(i₂)
  H = emptyHistogram()
  H · bounds · push(a₁)
  repeat
    b = newBucket()
    u₁ = D₁[b₁ · upper]
    u₂ = D₂[b₂ · upper]
    u = min(u₁, u₂)
    if u₁ == u₂ then
      j₁ = b₁ · upper
      j₂ = b₂ · upper
    else if u == u₁ then
      j₁ = b₁ · upper
      j₂ = lowerBound(D₂, u)
    else
      j₁ = lowerBound(D₁, u)
      j₂ = b₂ · upper
```

Code Listing 2: Non-limiting example pseudo code for constructing a join histogram.

```
end if
b · upper = u
b · cardinality = min(b₁ · estimated_distinct([i₁, j₁)), b₂ · estimated_distinct([i₂, j₂)))*
```

$$\frac{b_1.\text{estimated\_cardinality}([i_1, j_1))*b_2.\text{estimated\_cardinality}([i_2, j_2))}{b_1.\text{estimated\_distinct}([i_1, j_1))*b_2.\text{estimated\_distinct}([i_2, j_2))}$$

```
b · distinct = min(b₁ · estimated_distinct([i₁, j₁)), b₂ · estimated_ distinct([i₂, j₂)))
H · addBucket(b)
// continue defining the next bucket after b
if u == u₁ then
   b₁ = H₁ · after(b₁)
end if
if u == u₂ then
   b₂ = H₂ · after(b₂)
end if
i₁ = j₁
i₂ = j₂
until u ≥ a₂
return H
```

The embodiments of FIGS. 1-6 are directed to methods and systems to construct a histogram H for the column J of the join relation Join(J), using the input histograms $H_1$ and $H_2$, without computing the join query or accessing the base data of the relations. Also, in these embodiments of FIGS. 1-6, if the input first and second histograms are error-bounded (e.g., θ, q-acceptable), the join histogram comprising the join buckets (e.g., interval) and the associated join estimate frequency is also error-bounded (e.g., θ, q-acceptable.)

In some embodiments, the query can be on the input histograms with ranges restricted to a single bucket. These input histograms $H_1$ and $H_2$ can have some $\theta_1$ and $\theta_2$ and $q_1$ and $q_2$ such that cardinality estimate over a single bucket is either $\theta_1$, $q_1$-acceptable or $\theta_2$, $q_2$-acceptable, respectively. For example, the resulting bucket computed in the histogram construction algorithm can be equal to the sum of the corresponding distinct element frequency estimates. Thus, for a bucket computed by the algorithm containing d distinct elements, the bucket can yield d $\theta_1$ $\theta_2$, q'-acceptable cardinality estimates. In one example, a bucket is d' $\theta_1$ $\theta_2$, q'-acceptable, where d' is the maximum distinct value count for a single bucket in the produced histogram.

According to some embodiments, constructing join histograms can include taking maximum intervals contained in one bucket of both histograms $H_1$ and $H_2$. One example can include iterating over the buckets of $H_1$ and $H_2$ by looking up the dictionary values stored at the next bucket boundary and comparing them to find the largest valid range for the next bucket to add to $H_J$.

Figure 7:
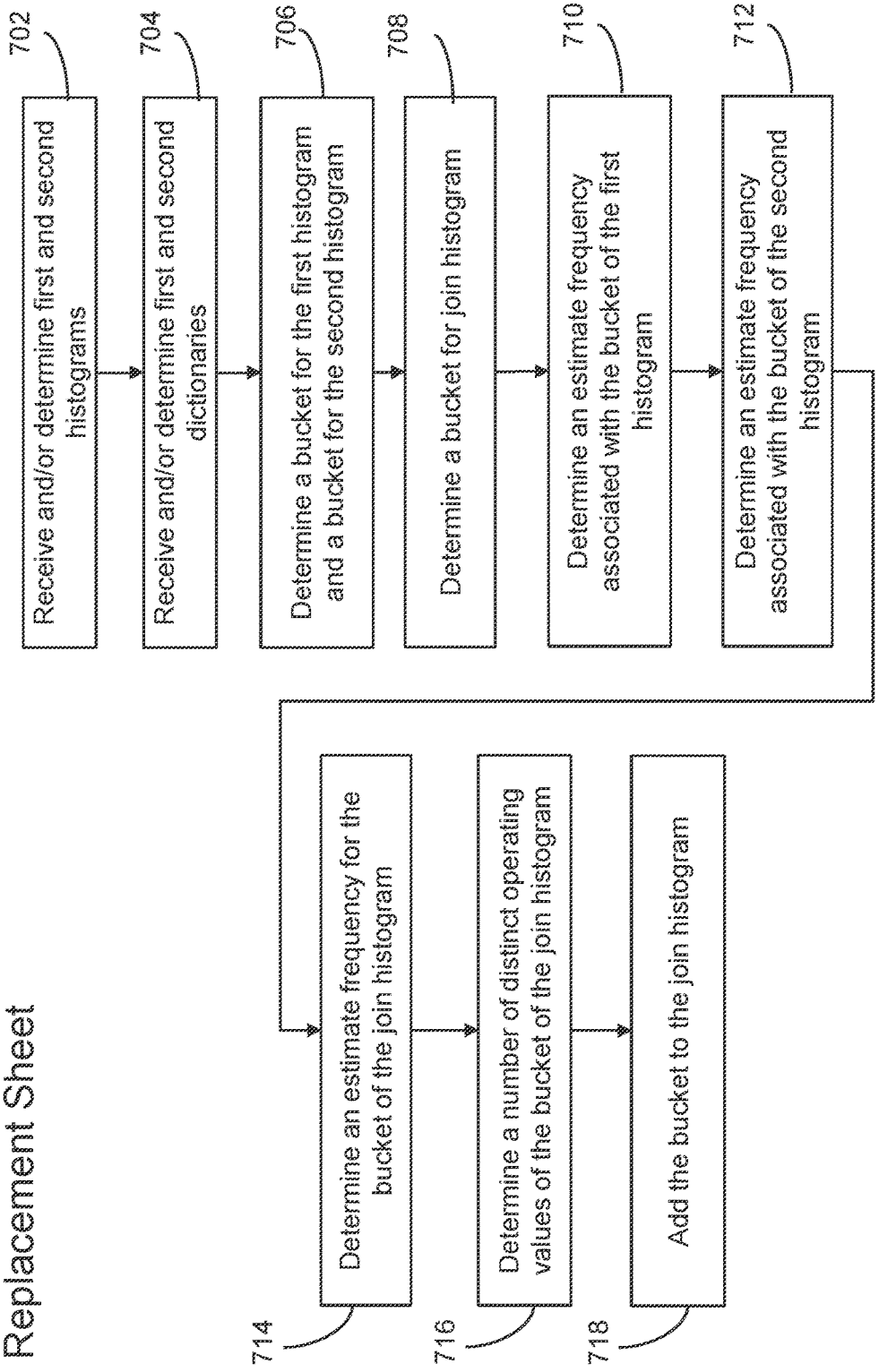
FIG. 7 is a flowchart illustrating a process for constructing a join histogram, according to some embodiments.

FIG. 7 is a flowchart for a method 700, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall be described with reference to FIGS. 1-6. However, method 700 is not limited to that example embodiment.

In 702, data statistic object generator 208 (alone or in combination with query optimizer 204) receives and/or determines a first histogram associated with a data structure (e.g., the column of a first table) and a second histogram associated with a data structure (e.g., the column of a second table.) In some embodiments data statistic object generator 208 (alone or in combination with query optimizer 204) can receive the first histogram and the second histogram from, for example, metadata 108 and/or data source 106.

In 704, data statistic object generator 208 (alone or in combination with query optimizer 204) receives and/or determines a first dictionary associated with the first histogram and a second dictionary associated with the second histogram. As discussed above, according to some embodiments, data structures such as columns of tables can be dictionary-encoded by ordered dictionaries. That is, the distinct values in a column are mapped to the integers 0 to n in sorted order. The histograms for these attributes can be built on the dictionary values. In other words, data structures such as columns of tables are represented by ordered dictionaries mapping the natural numbers to actual distinct domain values. For any range of actual domain values [l,u], there are corresponding ranges $[i_1,j_1]$ for one data structure and $[i_2,j_2]$ for another data structure, which are the minimum ranges containing dictionary entries mapping to an element in the range [l,u]. According to some embodiments, data statistic object generator 208 (alone or in combination with query optimizer 204) can also receive and/or determine range boundaries too.

In 706, data statistic object generator 208 (alone or in combination with query optimizer 204) determines a bucket for the first histogram and a bucket for the second histogram. Each histogram sorts values into buckets. As discussed above, in determining the buckets, data statistic object generator 208 (alone or in combination with query optimizer 204) is configured to determine the range of the bucket, the estimate frequency in each bucket, and the number of distinct occurring values in each bucket for each of the first and second histograms. In one example, the estimate frequency for a bucket indicates the number of values that are inside the range associated with that bucket that are stored in the attribute of the relation. In one example, the distinct occurring values for the bucket indicates the actual values inside that range that are stored in the attribute of the relation. In determining the bucket for the first histogram and the bucket for the second histogram, data statistic object generator 208 (alone or in combination with query optimizer 204) determines the lower and upper boundary associated with each bucket. Because these buckets are based on the first and second dictionaries, the difference between the upper bound and the lower bound for each bucket indicates the number of distinct occurring values in that bucket.

In 708, data statistic object generator 208 (alone or in combination with query optimizer 204) determines a join interval (e.g., a join bucket) for the join histogram based on the determined intervals (e.g., buckets) of the first and second histograms in 706. In one example, data statistic object generator 208 (alone or in combination with query optimizer 204) is configured to determine the join bucket for the join histogram based on an overlap of the buckets of the first and second histograms determined in 706. Additionally or alternatively, other methods discussed above with respect to FIGS. 4-6 can be used to determine the bucket for the join histogram based on the buckets of the first and second histograms determined in 706.

In 710, data statistic object generator 208 (alone or in combination with query optimizer 204) determines an estimate frequency associated with the bucket of the first histogram. This estimate frequency is stored in the first histogram and can indicate the number of values that are inside the range associated with that bucket of the first histogram that are stored in the attribute of the relation. Similarly, in 712, data statistic object generator 208 (alone or in combination with query optimizer 204) determines an estimate frequency associated with the bucket of the second histogram.

In 714, data statistic object generator 208 (alone or in combination with query optimizer 204) determines a join estimate frequency for the bucket of the join histogram. In some embodiments the join estimate frequency of the bucket of the join histogram is determined by (1) multiplying the estimate frequency of the corresponding bucket of the first histogram by the estimate frequency of the corresponding bucket of the second histogram (to generate an intermediate estimate frequency) and (2) dividing the result of the multiplication (the intermediate estimate frequency) by the maximum of the number of distinct values in the range of the corresponding bucket of the first histogram and in the range of the corresponding bucket of the second histogram. Additionally or alternatively, data statistic object generator 208 (alone or in combination with query optimizer 204) can add the join estimate frequencies for all the buckets of the join histogram to determine a cardinality (e.g., estimate frequency) for the whole join histogram. In other words, in each iteration that data statistic object generator 208 (alone or in combination with query optimizer 204) determines the join estimate frequency of a new join bucket of the join histogram, data statistic object generator 208 (alone or in combination with query optimizer 204) can add the newly determined join estimate frequency to the previously calculated ones. Therefore, by the end of the iterations, a (total) cardinality for the whole join histogram is calculated.

In 716, data statistic object generator 208 (alone or in combination with query optimizer 204) determines the number of distinct operating values of the bucket of the join histogram. In some embodiment, the number of distinct operating values of the bucket of the join histogram can be equal to the minimum of the number of distinct values in the range of the corresponding bucket of the first histogram and in the range of the corresponding bucket of the second histogram.

In 718, data statistic object generator 208 (alone or in combination with query optimizer 204) adds the bucket to the join histogram. This generated bucket includes the calculated interval (e.g., bucket range), estimate frequency, and estimated number of distinct operating values. In some embodiments, the method 700 can further repeat to generate more buckets for the join histogram. When all the buckets are determined, the join histogram is constructed. In some embodiments, the method 700 can repeat until all the buckets in the first and second histograms have been considered and/or based on the boundary ranges received and/or determined.

According to some embodiments, the join histogram and/or each bucket produced using this method 700 is error-bounded (e.g., $\theta_1$ $\theta_2$, $q_1 q_2$-acceptable.)

Code Listing 3 below illustrates one example of an algorithm implemented by data statistic object generator 208 (alone or in combination with query optimizer 204) discussed above with respect to FIG. 7. However, in other embodiments, data statistic object generator 208 (alone or in combination with query optimizer 204) can implement other code/pseudo code/algorithms. The initJoinIteration subroutine can perform the computation to initialize the computation ranges and eliminate non-overlapping portions of the domain. The doJoinIteration subroutine can perform the work to select the next maximum domain interval to be used in each iteration of the main loop. The initBuckets initializes the join histogram with the vector of computed buckets, and performs bucket compression steps, as discussed in more detail later in the disclosure.

Code Listing 3: Non-limiting example pseudo code for constructing a join histogram..

```
buildJoinHistogram (H_1, H_2, D_1, D_2, {(, [} low, high{],)}):
Output: join histogram H_J
index i_1, i_2, j_1, j_2, a_1, a_2, bound_1 = 0, bound_2 = 0
value u_1, u_2, u
bool flag_1, flag_2
vector buckets, boundaries_1, boundaries_2
bucket b
if H_1 · empty() \/ H_2 · empty() then
  return H_J // empty join histogram
end if
// initJoinIteration() initializes u, i_1, i_2, a_1, a_2, boundaries_1, boundaries_2
initJoinIteration(H_1, H_2, D_1, D_2, low, high, u, i_1, i_2, a_1, a_2, boundaries_1, boundaries_2)
if i_1 == H_1 · maxValue() \/ i_2 == H_2 · maxValue() then
  return H_J // empty join histogram,
end if
b · begin = max(D_1[i_1], D_2[i_2])
while i_1 < a_1 /\ i_2 < a_2 do
```

Code Listing 3: Non-limiting example pseudo code for constructing a join histogram..

```
// compute the next bucket
doJoinIteration(H₁, H₂, D₁, D₂, low, high, u, i₁, i₂, a₁, a₂, boundaries₁, boundaries₂)
if i₁ == j₁ then
  continue
end if
b · end = u
b · cardinality = min(H₁ · estimated_distinct([i₁, j₁)), H₂ · esimated_distinct([i₂, j₂)))*
```

$$\frac{H_1.\text{estimated\_cardinality}([i_1, j_1))^* \quad H_2.\text{estimated\_cardinality}([i_2, j_2))}{H_1.\text{estimated\_distinct}([i_1, j_1))^* H_2.\text{estimated\_distinct}([i_2, j_2))}$$

```
b · distinct = min(H₁ · estimated_distinct([i₁, j₁)), H₂ · estimated_distinct(i₂, j₂)))
buckets · push(copy(b))
b · begin = b · end
i₁ = j₁
i₂ = j₂
end while
buckets · last() · end + +
H_J · initBuckets(buckets)
return H_J
```

According to some embodiments, the data structures (e.g., columns of a table) on which the query is performed (e.g., join operation) can be stored without using ordered dictionaries. Additionally or alternatively, ordered dictionaries of data structures can be different and do not correspond to each other. The embodiments of these disclosure (e.g., constructing the join histogram) can also be applied to these situations where no dictionaries are used and/or the histograms based on the dictionaries are transformed to histogram based on the attributes of the data structures before generating the join histogram.

According to some embodiments, a method similar to method 700 of FIG. 7 can be applied to construct the join histogram when considering histograms with no dictionaries associated. In this method, (similar to 702) data statistic object generator 208 (alone or in combination with query optimizer 204) receives and/or determines a first histogram associated with a data structure (e.g., the column of a first table) and a second histogram associated with a data structure (e.g., the column of a second table.) However, (unlike 704) data statistic object generator 208 (alone or in combination with query optimizer 204) does not receive and/or determine a first dictionary associated with the first histogram and a second dictionary associated with the second histogram.

Continuing with this example, (and similar to 706) data statistic object generator 208 (alone or in combination with query optimizer 204) determines a bucket for the first histogram and a bucket for the second histograms. Data statistic object generator 208 (alone or in combination with query optimizer 204) determines (similar to 708) a bucket for the join histogram based on the determined buckets of the first and second histograms.

Continuing with this example, (and similar to 710 and 712) data statistic object generator 208 (alone or in combination with query optimizer 204) determines an estimate frequency associated with the bucket of the first histogram and an estimate frequency associated with the bucket of the second histogram. In some embodiments, the estimate frequencies associate with the buckets of the first and second histograms are determined over a common range of the bucket for both the first and second histograms.

In this method, data statistic object generator 208 (alone or in combination with query optimizer 204) determines an estimate frequency for the bucket of the join histogram. In some embodiments the estimate frequency of the bucket of the join histogram is determined by (1) multiplying the estimate frequency of the corresponding bucket of the first histogram by the estimate frequency of the corresponding bucket of the second histogram (to generate an intermediate estimate frequency) and (2) dividing the result of the multiplication (the intermediate estimate frequency) by the maximum of the number of distinct operating values of the corresponding bucket of the first histogram and the distinct operating values of the corresponding bucket of the second histogram.

Continuing with this example (and similar to 716) data statistic object generator 208 (alone or in combination with query optimizer 204) determines the number of distinct operating values of the bucket of the join histogram. In some embodiment, the number of distinct operating values of the bucket of the join histogram can be equal to the minimum of the distinct operating values of the corresponding bucket of the first histogram and the distinct operating values of the corresponding bucket of the second histogram.

Data statistic object generator 208 (alone or in combination with query optimizer 204) adds the bucket to the join histogram. This generated bucket includes the calculated interval (e.g., bucket range), estimate frequency, and number of distinct operating values. In some embodiments, this method can further repeat to generate more buckets for the join histogram. When all the buckets are determined, the join histogram is constructed. In some embodiments, this method can repeat until all the buckets in the first and second histograms have been considered and/or based on the boundary ranges received and/or determined.

According to some embodiments, the join histogram and/or each bucket produced using this method is error-bounded (e.g., $\theta_1 \theta_2$, $q_1 q_2$-acceptable.)

Code Listing 4 below illustrates one example of an algorithm implemented by data statistic object generator 208 (alone or in combination with query optimizer 204) discussed above with respect to the method of generating join histograms based on histograms with no associated dictionaries. However, in other embodiments, data statistic object generator 208 (alone or in combination with query optimizer 204) can implement other code/pseudo code/algorithms. The initJoinIterationNoDict subroutine can perform the computation to initialize the computation ranges and eliminate non-overlapping portions of the domain for histograms with no associated dictionaries. The doJoinIterationNoDict subroutine can perform the work to select the next maximum domain interval to be used in each iteration of the main loop for histograms with no associated dictionaries. The initBuckets initializes the join histogram with a vector of buckets, and performs bucket compression steps, as discussed in more detail later in the disclosure.

Also, $b_1$.distinct is the number of distinct operating values in bucket $b_1$. In alternate or additional examples, if the condition $$b_1 \cdot \text{cardinality} + b_2 \cdot \text{cardinality} \leq \frac{\theta}{q}$$

is met, then buckets $b_1$ and $b_2$ can be merged regardless of any extra q-error incurred, since the error will remain below the $\theta$ bound for the buckets.

Code Listing 4: Non-limiting example pseudo code for constructing a join histogram with no dictionaries.

```
buildJoinHistogramNoDict (H_1, H_2, {(, [} low, high{],)}):
histogram H_J
value i, a, j
index bound_1, bound_2
vector buckets, boundaries_1, boundaries_2
bucket b
if H_1 · empty() \/ H_2 · empty() then
  return H_J
end if
initJoinIterationNoDict()
while i < a do
  doJoinIterationNoDict()
  if i == j then
    continue
  end if
  b · begin = i
  b · end = j
  b · cardinality = min(H_1 · estimated_distinct([i_1, j_1)), H_2 · estimated_distinct([i_2, j_2)))*

H_1.estimated_cardinality([i_1, j_1))*
          H_2.estimated_cardinality([i_2, j_2))
       ─────────────────────────────────────────────
       H_1.estimated_distinct ([i_1, j_1))*H_2.estimated_distinct([i_2, j_2))

b · distinct = min(H_1 · estimated_distinct([i_1, j_1)), H_2 · estimated_distinct([i_2, j_2)))
  buckets · push(copy(b))
  i = j
end while
H_J · initBuckets(buckets)
return H_J
```

Alternatively or additionally, one or more of the assumptions 1 and 2 above can be relaxed. In some embodiments, some histograms can be made up of some atomic range boundaries for which a single value is stored and is uniformly distributed amongst distinct elements of the range. For example, one bucket type can contain several buckets, each of which satisfying one or more of assumptions above.

In one example, instead of relying on bucket boundaries, input histograms can provide access to these atomic range boundaries via some function interface (e.g., nextUniformBoundary.) This can allow to trade some efficiency in exchange for more accurate estimates.

According to some embodiments, to conserve memory, adjacent buckets in the join histogram can be merged (e.g., combined), if possible. In some examples, two adjacent buckets $b_1$ and $b_2$ of the join histogram can be combined if the condition $$\frac{b_1 \cdot \text{cardinality}}{b_1 \cdot \text{distinct}} = \frac{b_2 \cdot \text{cardinality}}{b_2 \cdot \text{distinct}}$$

is met. Here, $b_1$.cardinality is the number of values in bucket $b_1$ (e.g., the estimated frequency associated with bucket $b_1$).

Therefore, in some embodiments, after generating the join buckets of the join histogram, data statistic object generator 208 (alone or in combination with query optimizer 204) is configured to examine the generated join buckets and determine whether any two or more adjacent join buckets of the join histogram can be merged. When data statistic object generator 208 (alone or in combination with query optimizer 204) determines that conditions discussed above are met, then data statistic object generator 208 (alone or in combination with query optimizer 204) can merge the adjacent join buckets into a new bucket. In one example, data statistic object generator 208 (alone or in combination with query optimizer 204) is configured to repeat the examination and the merger for all the join buckets in the join histogram.

In one example, data statistic object generator 208 (alone or in combination with query optimizer 204) merges two adjacent buckets $b_1$ and $b_2$ by (1) changing the upper bound of bucket $b_1$ to the upper bound of bucket $b_2$, (2) updating the join estimate frequency of bucket $b_1$ by adding the join estimate frequencies of buckets $b_1$ and $b_2$, and (3) updating the number of distinct operating values of bucket $b_1$ by adding the number of distinct operating values of buckets $b_1$ and $b_2$.

In some embodiments, since the algorithm computes the upper and lower bounds of each domain first, any non-overlapping segments of the domain can be eliminated from the search. This can prevent the algorithm from cycling through many buckets adding zero cardinality to the join estimate. In some embodiments, by applying this idea to individual buckets, it can be detected whether or not the two buckets currently being inspected intersect at all, and ignore them if they do not. In some cases, this can be done without any additional dictionary lookups; the algorithm can simply come across an empty interval and skip it.

Code Listing 5 below illustrates one example of an algorithm implemented by data statistic object generator 208 (alone or in combination with query optimizer 204) discussed above with respect to merging adjacent buckets in the join histogram. However, in other embodiments, data statistic object generator 208 (alone or in combination with query optimizer 204) can implement other code/pseudo code/algorithms.

processor 804. Processor 804 is connected to a communication infrastructure or bus 806.

One or more processors 804 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure 806 through user input/output interface(s) 802.

Computer system 800 also includes a main or primary memory 808, such as random access memory (RAM). Main

---

Code Listing 5: Non-limiting example pseudo code for merging adjacent buckets in the join histogram.

```
initBuckets (H, buckets) :
i = 0
while i < buckets · size() do
  j = i +1
```

$$\text{while} \begin{cases} j < \text{buckets.size()} \land \\ ((\text{buckets}[j].\text{count}/\text{buckets}[j].\text{distinct} == \\ \text{buckets}[i].\text{count}/\text{buckets}[i].\text{distinct}) \\ \bigvee (\text{buckets}[i].\text{count} + \text{buckets}[j].\text{count} \le \theta/q)) \end{cases}$$

```
do
  buckets[i] · end = buckets[j] · end
  buckets[i] · count+ = buckets[j] · count
  buckets[i] · distinct+ = buckets[j] · distinct
  j++
end while
H · addBucket(buckets[i])
i = j
end while
```

---

It is noted that although the embodiments of this disclosure are discussed with respect to two columns and two histograms, this disclosure is not limited and can include a query, which can include a join query of two or more tables. In other words, the embodiments of this disclosure can be extended to creating a join histogram from two or more input histograms without accessing the base data or computing the join relation. Under certain assumptions, an error-bound can be placed on the produced join histogram created from the two or more input histograms.

Figure 8:
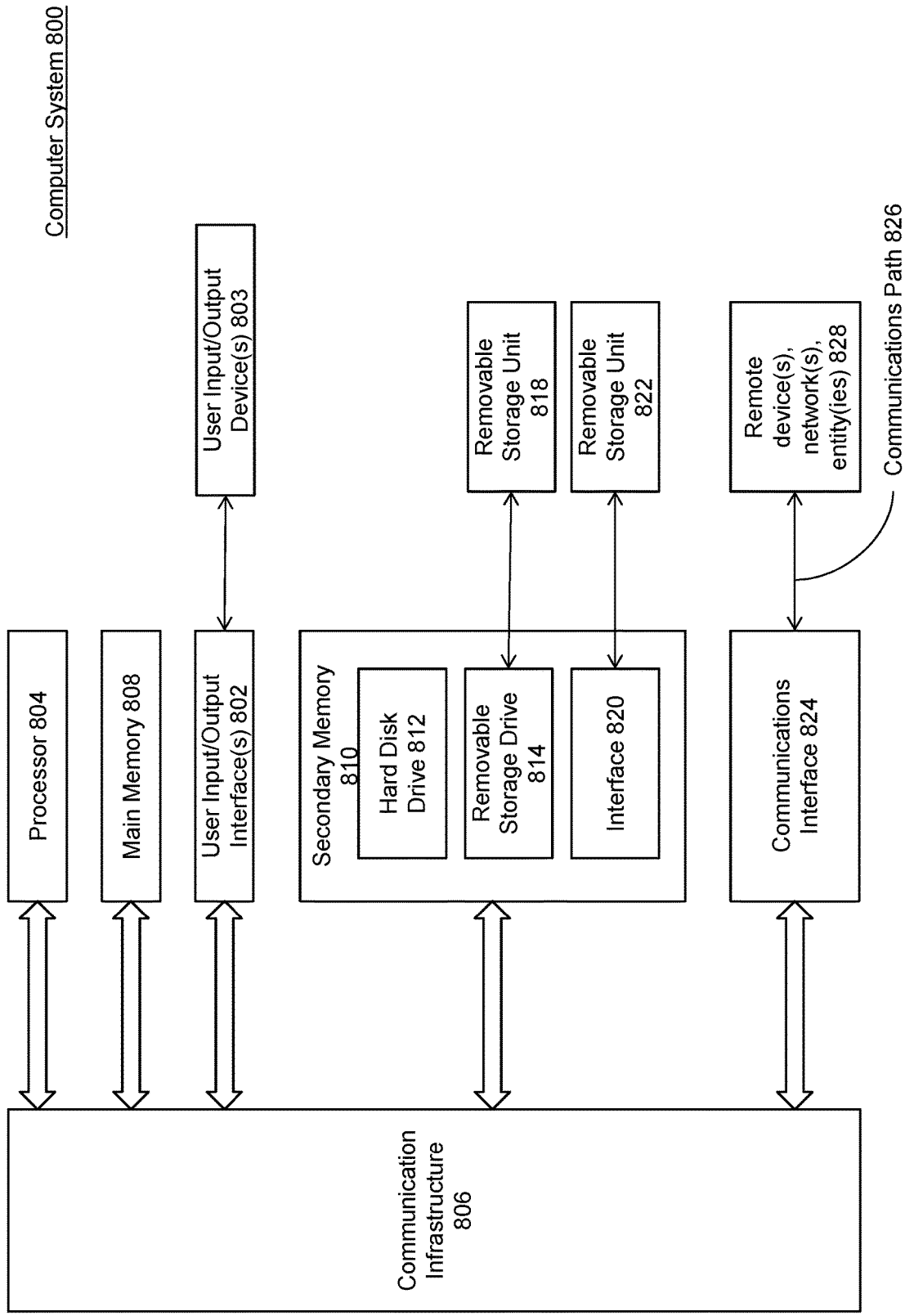
FIG. 8 is an example computer system useful for implementing various embodiments.

Various embodiments can be implemented, for example, using one or more computer systems, such as computer system 800 shown in FIG. 8. Computer system 800 can be used, for example, to implement method 300 of FIG. 3, method 400 of FIG. 4, method 500 of FIG. 5, method 700 of FIG. 7, and/or any other method discussed in this disclosure. For example, computer system 800 can construct a join histogram from the input histograms without accessing the base data or computing the join relation (and under certain assumptions, a q-error bound can be placed on the produced join histogram), according to some embodiments. Computer system 800 can be any computer capable of performing the functions described herein.

Computer system 800 can be any well-known computer capable of performing the functions described herein.

Computer system 800 includes one or more processors (also called central processing units, or CPUs), such as a memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an embodiment, a tangible apparatus or article of manufacture comprising a tangible computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A computer implemented method, comprising:
   determining, by at least one processor, a first interval associated with a first input histogram of a first data structure, wherein the determination of the first interval is based at least in part on determination of a first range, a first estimate frequency associated with the first interval including a first number of values that are inside the first range associated with the first interval, and a first number of distinct occurring values in the first interval;
   determining, by the at least one processor, a second interval associated with a second input histogram of a second data structure, wherein the determination of the second interval is based at least in part on determination of a second range, a second estimate frequency associated with the second interval including a second number of values that are inside the second range associated with the second interval, and a second number of distinct occurring values in the second interval;
   determining, by the at least one processor, a join interval based on the first and second intervals by calculating an intersection of the first and second intervals;
   calculating, by the at least one processor, a join estimate frequency based on the first and second estimate frequencies corresponding to the first and second intervals, respectively;
   building a join histogram from the first and second input histograms, wherein the join histogram is equal to or smaller in size than the sum of the sizes of the first and second input histograms, where an interval for the join histogram is based on the join interval; and
   estimating a cardinality of a join query based on the join histogram,
   wherein at least one of the determining the first interval, the determining the second interval, the determining the join interval, and the calculating are performed by one or more computers.

2. The computer implemented method of claim 1, wherein the determining a join estimate frequency further comprises:
   multiplying, by the at least one processor, the first estimate frequency by the second estimate frequency to generate an intermediate estimate frequency; and
   dividing, by the at least one processor, the intermediate estimate frequency by a maximum of number of distinct values of the first interval and of the second interval to calculate the join estimate frequency.

3. The computer implemented method of claim 1, wherein the determining a join interval further comprises:

determining, by the at least one processor, a minimum of the first and second number of distinct values.

4. The computer implemented method of claim 3, wherein the determining a join estimate frequency further comprises:
multiplying, by the at least one processor, the first estimate frequency by the second estimate frequency to generate an intermediate estimate frequency; and
dividing, by the at least one processor, the intermediate estimate frequency by a maximum of the first and second number of distinct values to calculate the join estimate frequency.

5. The computer implemented method of claim 1, further comprising:
repeating, by the at least one processor, the determining the first interval and the first estimate frequency, the determining the second interval and the second estimate frequency, the determining the join interval, and the calculating to generate a second join interval with an associated second join estimate frequency; and
combining, by the at least one processor, the join interval and the second join interval.

6. The computer implemented method of claim 1, further wherein the join histogram comprises the join interval and the join estimate frequency, wherein the join histogram is error-bounded.

7. The computer implemented method of claim 6, further comprising:
receiving, by the at least one processor, a query request; and
using, by the at least one processor, the join histogram to generate a query execution plan for executing the query request.

8. A system, comprising:
a memory; and
at least one processor coupled to the memory and configured to:
determine a first interval associated with a first input histogram of a first data structure, wherein the determination of the first interval is based at least in part on determination of a first range, a first estimate frequency associated with the first interval including a first number of values that are inside the first range associated with the first interval, and a first number of distinct occurring values in the first interval;
determine a second interval associated with a second input histogram of a second data structure, wherein the determination of the second interval is based at least in part on determination of a second range, a second estimate frequency associated with the second interval including a second number of values that are inside the second range associated with the second interval, and a second number of distinct occurring values in the second interval;
determine a join interval based on the first and second intervals by calculating an intersection of the first and second intervals;
calculate a join estimate frequency based on the first and second estimate frequencies, corresponding to the first and second intervals, respectively; and
build a join histogram from the first and second input histograms, wherein the join histogram is equal to or smaller in size than the sum of the sizes of the first and second input histograms, where an interval for the join histogram is based on the join interval; and
estimate a cardinality of a join query based on the join histogram.

9. The system of claim 8, wherein to determine a join estimate frequency the at least one processor is configured to:
multiply the first estimate frequency by the second estimate frequency to generate an intermediate estimate frequency; and
divide the intermediate estimate frequency by a maximum of number of distinct values of the first interval and of the second interval to calculate the join estimate frequency.

10. The system of claim 8, wherein to determine a join interval the at least one processor is configured to:
determine a minimum of the first and second number of distinct values.

11. The system of claim 10, wherein to determine a join estimate frequency the at least one processor is configured to:
multiply the first estimate frequency by the second estimate frequency to generate an intermediate estimate frequency; and
divide the intermediate estimate frequency by a maximum of the first and second number of distinct values to calculate the join estimate frequency.

12. The system of claim 8, the at least one processor further configured to:
repeat the determining the first interval and the first estimate frequency, the determining the second interval and the second estimate frequency, the determining the join interval, and the calculating to generate a second join interval with an associated second join estimate frequency; and
combine the join interval and the second join interval.

13. The system of claim 8,
further wherein the join histogram comprises the join interval and the join estimate frequency, wherein the join histogram is error-bounded.

14. The system of claim 13, the at least one processor further configured to:
receiving a query request; and
use the join histogram to generate a query execution plan for executing the query request.

15. A tangible computer-readable device having instructions stored thereon that, when executed by at least one computing device, causes the at least one computing device to perform operations comprising:
determining a first interval associated with a first input histogram of a first data structure wherein the determination of the first interval is based at least in part on determination of a first range, a first estimate frequency associated with the first interval including a first number of values that are inside the first range associated with the first interval, and a first number of distinct occurring values in the first interval;
determining a second interval associated with a second input histogram of a second data structure, wherein the determination of the second interval is based at least in part on determination of a second range, a second estimate frequency associated with the second interval including a second number of values that are inside the second range associated with the second interval, and a second number of distinct occurring values in the second interval;
determining a join interval based on the first and second intervals by calculating an intersection of the first and second intervals;

calculating a join estimate frequency based on the first and second estimate frequencies corresponding to the first and second intervals, respectively; and building a join histogram from the first and second input histograms, wherein the join histogram is equal to or smaller in size than the sum of the sizes of the first and second input histograms, where an interval for the join histogram is based on the join interval; and estimating a cardinality of a join query based on the join histogram.

16. The tangible computer-readable device of claim 15, the operations further comprising:

repeating the determining the first interval and the first estimate frequency, the determining the second interval and the second estimate frequency, the determining the join interval, and the calculating to generate a second join interval with an associated second join estimate frequency; and combining the join interval and the second join interval.

17. The tangible computer-readable device of claim 15, further wherein the join histogram comprises the join interval and the join estimate frequency, wherein the join histogram is error-bounded.

18. The tangible computer-readable device of claim 15, the determining a join estimate frequency comprising:

multiplying the first estimate frequency by the second estimate frequency to generate an intermediate estimate frequency; and dividing the intermediate estimate frequency by a maximum of number of distinct values of the first interval and of the second interval to calculate the join estimate frequency.

19. The tangible computer-readable device of claim 15, the determining a join interval comprising:

determining a minimum of the first and second number of distinct values.

20. The tangible computer-readable device of claim 19, the determining a join estimate frequency comprising:

multiplying the first estimate frequency by the second estimate frequency to generate an intermediate estimate frequency; and dividing the intermediate estimate frequency by a maximum of the first and second number of distinct values to calculate the join estimate frequency.

* * * * *